(12) United States Patent
Suda

(10) Patent No.: US 7,471,889 B2
(45) Date of Patent: Dec. 30, 2008

(54) FOCUS DETECTION SYSTEM FOR FOCUS ADJUSTMENT HAVING DIFFERENTLY-SIZED APERTURES AND USING A PAIR OF SIGNALS FORMED BY A PENCIL OF RAYS PASSING THROUGH DIFFERENT REGIONS OF EXIT PUPIL OF IMAGING LENS

(75) Inventor: Yasuo Suda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 11/101,512

(22) Filed: Apr. 8, 2005

(65) Prior Publication Data

US 2005/0226609 A1    Oct. 13, 2005

(30) Foreign Application Priority Data

Apr. 13, 2004 (JP) ............................. 2004-118228

(51) Int. Cl.
*G02B 7/28* (2006.01)
*H04N 5/232* (2006.01)

(52) U.S. Cl. ...................................... 396/114; 348/349

(58) Field of Classification Search ................. 396/111, 396/113, 115, 80, 114, 121; 348/345, 349, 348/350
See application file for complete search history.

(56) References Cited

U.S. PATENT DOCUMENTS

| 4,555,169 A | 11/1985 | Suda et al. | 354/407 |
|---|---|---|---|
| 4,618,236 A | 10/1986 | Akashi et al. | 354/406 |
| 4,634,255 A | 1/1987 | Suda et al. | 354/406 |
| 4,643,557 A | 2/1987 | Ishizaki et al. | 354/406 |
| 4,670,645 A | 6/1987 | Ohtaka et al. | 250/201 |
| 4,688,920 A | 8/1987 | Suda et al. | 354/406 |
| 4,709,138 A | 11/1987 | Suda et al. | 250/201 |
| 4,716,282 A | 12/1987 | Akashi et al. | 250/201 |
| 4,728,785 A | 3/1988 | Ohnuki et al. | 250/201 |
| 4,739,157 A | 4/1988 | Akashi et al. | 250/201 |
| 4,774,539 A | 9/1988 | Suda et al. | 354/406 |
| 4,792,668 A | 12/1988 | Akashi et al. | 250/201 |
| 4,792,669 A | 12/1988 | Ohnuki et al. | 250/201 |
| 4,800,410 A | 1/1989 | Akashi et al. | 354/408 |
| 4,812,869 A | 3/1989 | Akashi et al. | 354/408 |
| 4,825,239 A | 4/1989 | Suda et al. | 354/402 |
| 4,833,313 A | 5/1989 | Akashi et al. | 250/201 |
| 4,855,777 A | 8/1989 | Suda et al. | 354/402 |
| 4,859,842 A | 8/1989 | Suda et al. | 250/201 |

(Continued)

FOREIGN PATENT DOCUMENTS

JP          55-111927          8/1980

(Continued)

*Primary Examiner*—Rodney E Fuller
(74) *Attorney, Agent, or Firm*—Fitzpatrick, Cella, Harper & Scinto

(57) ABSTRACT

A focus detection system including a sensor unit including a plurality of photoelectric conversion elements and a focus detection unit for performing focus adjustment using a pair of signals output from the sensor unit. In the sensor unit, an aperture corresponding to each of the photoelectric conversion elements positioned in the outer area is smaller than an aperture corresponding to each of the photoelectric conversion elements positioned in the central area. In the focus detection unit, the pair of signals is formed by pencils of rays passing through different regions of an exit pupil of an imaging lens.

20 Claims, 15 Drawing Sheets

U.S. PATENT DOCUMENTS

| | | | |
|---|---|---|---|
| 4,878,078 A | 10/1989 | Koyama et al. | 354/402 |
| 4,908,645 A | 3/1990 | Higashihara et al. | 354/402 |
| 4,954,701 A | 9/1990 | Suzuki et al. | 250/201.8 |
| 4,959,677 A | 9/1990 | Suda et al. | 354/402 |
| 4,963,912 A | 10/1990 | Suda et al. | 354/404 |
| 4,992,817 A | 2/1991 | Aoyama et al. | 354/403 |
| 4,992,819 A | 2/1991 | Ohtaka et al. | 354/408 |
| 5,005,041 A | 4/1991 | Suda et al. | 354/407 |
| 5,091,742 A | 2/1992 | Fukahori et al. | 354/402 |
| 5,109,154 A | 4/1992 | Higashihara et al. | 250/201.8 |
| 5,140,359 A | 8/1992 | Higashihara et al. | 354/402 |
| 5,151,583 A | 9/1992 | Tokunaga et al. | 250/201.2 |
| 5,258,804 A | 11/1993 | Suda | 354/406 |
| 5,305,047 A | 4/1994 | Hayakawa et al. | 354/403 |
| 5,367,153 A | 11/1994 | Suda et al. | 250/201.8 |
| 5,422,700 A | 6/1995 | Suda et al. | 354/402 |
| 5,440,367 A | 8/1995 | Suda | 354/402 |
| 5,459,551 A | 10/1995 | Suzuki et al. | 354/403 |
| 5,473,403 A | 12/1995 | Suda et al. | 354/409 |
| 5,543,886 A | 8/1996 | Suda | 354/406 |
| 5,678,097 A | 10/1997 | Suda | 396/113 |
| 5,771,413 A | 6/1998 | Suda et al. | 396/114 |
| 5,797,049 A * | 8/1998 | Ohtaka et al. | 396/122 |
| 5,839,001 A | 11/1998 | Ohtaka et al. | 396/114 |
| 5,864,721 A | 1/1999 | Suda et al. | 396/114 |
| 6,097,894 A | 8/2000 | Suda | 396/51 |
| 6,229,959 B1 | 5/2001 | Suda et al. | 396/50 |
| 6,360,059 B1 | 3/2002 | Ide et al. | 396/114 |
| 6,933,978 B1 | 8/2005 | Suda | 348/345 |

FOREIGN PATENT DOCUMENTS

JP  2000-338392  12/2000

* cited by examiner

FOCUS DETECTION SYSTEM FOR FOCUS ADJUSTMENT HAVING DIFFERENTLY-SIZED APERTURES AND USING A PAIR OF SIGNALS FORMED BY A PENCIL OF RAYS PASSING THROUGH DIFFERENT REGIONS OF EXIT PUPIL OF IMAGING LENS

BACKGROUND OF THE INVENTION

1. Field of the Invention

The present invention relates to a focus detection system for performing focus adjustment.

2. Description of the Related Art

Japanese Patent Laid-Open No. 2000-338392 discloses a focus detector that re-forms a first-order image of an object, the first-order image being formed by an imaging lens, onto a light sensor, and that detects a focus using a pair of sensor outputs formed by a pencil of rays passing through different regions of an exit pupil of the imaging lens.

In this focus detector, an image of an object formed by the imaging lens is re-formed onto the light sensor with an absolute-value magnification of less than one. Therefore, a focus is advantageously detected in a large region of an image of an object with a small light sensor. If a micro lens is installed in the light sensor, the amount of light received is increased and the signal-to-noise ratio (SNR) is improved, and therefore, focus detection with good accuracy is expected.

Japanese Patent Laid-Open No. 55-111927 discloses a focus detector that receives a first-order image of an object formed by an imaging lens via a micro lens and that detects a focus using a pair of sensor outputs formed by a pencil of rays passing through different regions of an exit pupil of the imaging lens.

In this focus detector, an optical system for image reformation is not necessary and the light sensor is simply arranged adjacent to a first imaging face of the imaging lens. Therefore, one advantage obtained is that the structure becomes much simpler.

Focus detectors of the type disclosed in Japanese Patent Laid-Open No. 2000-338392 mentioned above commonly use an aperture stop when an image of an object formed by the imaging lens is re-formed onto the light sensor. Inversely projecting the aperture stop by a field lens in an exit pupil of the imaging lens restricts a region where a pencil of rays to be used in focus detection passes through the exit pupil. As a result, for a second-order image of the object formed through the same aperture stop, a region where a pencil of rays passes through the exit pupil of the imaging lens is constant at any position.

In imaging lenses for use in photography, two exit windows determined by two apertures (e.g., two lens surfaces) in many constituent lens elements determine a pencil of light in the outer region. A pencil of rays forming an image on the optical axis is widest, and another pencil of rays becomes narrower as it approaches the edges of an image circle due to vignetting.

In order to detect a focus with high accuracy even when the brightness of an object to be subjected to focus detection is low, it is effective to use as much of a pencil of rays forming an image of the object as possible for focus detection and to increase the amount of light introduced to a light sensor used for focus detection.

From this viewpoint, when a pencil of rays forming an image of an object is compared with a pencil of rays used in focus detection, only a small amount of the pencil of rays forming an image is used in focus detection around the optical axis, whereas much of the pencil of rays forming an image is used in focus detection at the edges of the image circle. In other words, a pencil of rays is not effectively used around the optical axis.

The focus detector disclosed in Japanese Patent Laid-Open No. 55-111927 requires a light sensor larger than at least a region used for focus detection. Therefore, when the focus detector is used in a film camera employing 35 mm film (135 film) or 120 film, a digital camera employing a large image sensor, or the like, a required focus-detection region is large because an image-capture screen is large. As a result, the light sensor used for focus detection is inevitably large and the focus detector is thus significantly expensive. On the other hand, if a small light sensor is used, a camera will have only a small focus-detection region and have poor usability, and this camera will be impractical.

SUMMARY OF THE INVENTION

The present invention provides a focus detection system capable of detecting a focus with high accuracy.

In one aspect of the present invention, a focus detection system includes a sensor unit including a plurality of photoelectric conversion elements and a focus detection unit for performing focus adjustment using a pair of signals output from the sensor unit. In the sensor unit, an aperture corresponding to each of the photoelectric conversion elements positioned in the outer area is smaller than an aperture corresponding to each of the photoelectric conversion elements positioned in the central area. In the focus detection unit, the pair of signals is formed by pencils of rays passing through different regions of an exit pupil of an imaging lens.

In another aspect of the present invention, a focus detection system includes an imaging lens, a half mirror for dividing light rays from the imaging lens into transmitted rays and reflected rays, a sensor unit including a plurality of photoelectric conversion elements, and a focus detection unit for performing focus adjustment using a pair of signals output from the sensor unit. In the sensor unit, an aperture corresponding to each of the photoelectric conversion elements positioned in the outer area is smaller than an aperture corresponding to each of the photoelectric conversion elements positioned in the central area. In the focus detection unit, the pair of signals is formed by pencils of rays passing through different regions of an exit pupil of the imaging lens. The reflected rays enter the sensor unit.

In yet another aspect, the present invention relates to a focus detecting device comprising (a) an imaging lens; (b) a light sensor comprising a plurality of pixels, each pixel comprising a plurality of microlenses and, corresponding to each microlens of the plurality of microlenses, an aperture and a photoelectric conversion unit, wherein light passes through the microlens and aperture in that order to reach the photoelectric conversion unit; and (c) a re-imaging lens for forming a plurality of second-order images on the light sensor using light from an object, wherein the plurality of pixels comprises a first plurality of pixels and a second plurality of pixels, the apertures of the first plurality of pixels being smaller than the apertures of the second plurality of pixels.

Further features and advantages of the present invention will become apparent from the following description of exemplary embodiments with reference to the attached drawings.

BRIEF DESCRIPTION OF THE DRAWINGS

FIG. 1A is a plan view of a photoelectric conversion unit of one pixel and FIG. 1B is a plan view of one pixel.

DESCRIPTION OF THE EMBODIMENTS

Embodiments of the present invention are described below with reference to the drawings.

FIGS. 1 to 9 and 12 to 15 are illustrations for the embodiments of the present invention. Here, the focus detection system according to the present invention incorporated into an SLR camera is shown as an example.

Figure 3A:
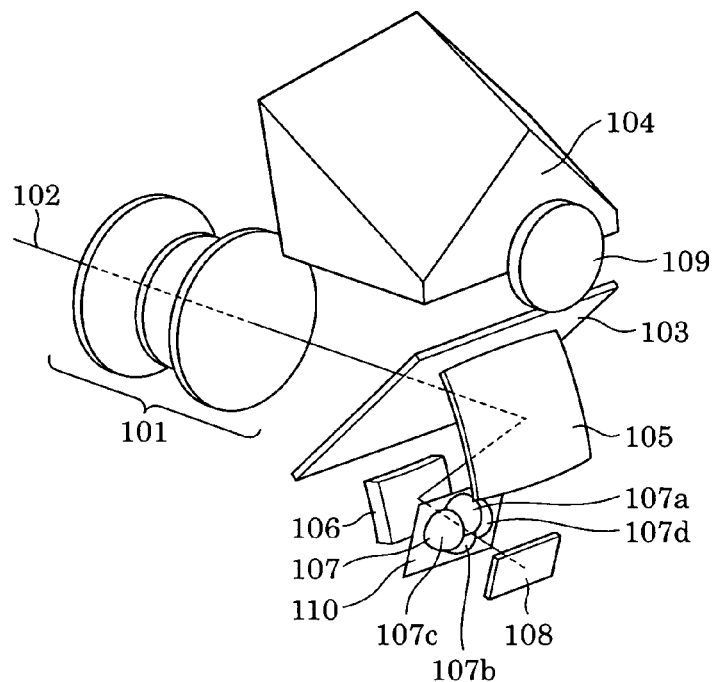
FIG. 3A is a perspective view of a single-lens reflex (SLR) camera according to an embodiment of the present invention.

FIG. 3A is a perspective view of the SLR camera. An imaging lens 101 is used for forming an image of an object, and an optical axis 102 is the optical axis for the imaging lens 101. The imaging lens 101 is capable of adjusting an imaging position in the direction of the optical axis 102 by a power source and driving mechanism (not shown). The imaging lens 101 may be a fixed-focal-length lens, a zoom lens, or a tilt-shift lens. Alternatively, the imaging lens 101 may be interchangeable with an imaging lens having various properties (e.g., f-number or focal length).

A pencil of rays exiting from the imaging lens 101 is divided into transmitted rays and reflected rays by a tilted half mirror 103. A penta-roof prism 104 is used for introducing the reflected rays to an eyepiece 109, and an ellipsoidal surface-coated mirror 105 is used for reflecting and concentrating the transmitted rays. Although not shown in FIG. 3A, a focal plane shutter and an area sensor serving as an image-capture surface are disposed at the rear of the surface-coated mirror 105. The reflected rays reflected from the half mirror 103 exit from the eyepiece 109 having passed through the penta-roof prism 104, so that a camera user can observe an image of an object as an erect image with the eyepiece 109. In an imaging state, the half mirror 103 and the surface-coated mirror 105 are moved out of the optical path for image capture, and the focal plane shutter is opened so that the area sensor is exposed to an appropriate amount of light.

The penta-roof prism 104 is made of a composite in which nobium oxide particles in the range of 5 nm to 30 nm are uniformly dispersed in acrylic resin. As a result, the penta-roof prism 104 realizes a high refractive index of the order of 1.8 and higher impact resistance than that of glass, and can be inexpensively produced by injection molding. Increasing the refractive index of the penta-roof prism 104 increases the finder magnification, thus facilitating observation of objects and checking of focus. This is of great value.

A conical mirror 106, a re-imaging lens 107 including a single toric concave face 107e at the entrance face and four elliptical convex faces 107a, 107b, 107c, and 107d at the exit face, a light sensor 108 used for focus detection, and the surface-coated mirror 105 are components of the focus detection system using a phase difference detection method.

The reflected rays reflected from the surface-coated mirror 105 are reflected from the conical mirror 106 and enter the re-imaging lens 107. Since the surface-coated mirror 105 is positioned in front of the image-capture surface, a first-order image of an object is formed between the surface-coated mirror 105 and the conical mirror 106. In addition, since the re-imaging lens 107 includes the four exit faces 170a to 170d, as described above, four second-order images of the object are formed on the light sensor 108 by these four faces.

The surface-coated mirror 105 has an effect of establishing a conjugate relationship between an exit pupil of the imaging lens 101 and an entrance pupil of the re-imaging lens 107. In other words, the surface-coated mirror 105 restricts a region where a pencil of rays passing through the re-imaging lens 107 for focus detection passes through the exit pupil of the imaging lens 101. In regular phase difference detection, it is necessary to determine a pencil of rays used-in focus detection in such a way that the pencil of rays does not undergo vignetting, because the vignetting leads to deteriorated accuracy of the focus detection. In particular, when an interchangeable imaging lens is used, it is necessary to ensure that the pencil of rays to be used in focus detection is not subjected to vignetting for any imaging lens element by setting an expected exit pupil as a representative position for an interchangeable imaging lens group.

A porous mask 110 used for preventing the occurrence of a ghost includes four apertures. Each aperture has a sufficient size for allowing an effective pencil of rays of the re-imaging lens 107 to pass therethrough. The conical mirror 106 is made of resin filled with a filler, such as silica, so as to suppress variations in shape depending on temperature or humidity, and is molded so as not to expose the filler on a mirror section.

The re-imaging lens 107 is made of a composite in which niobium oxide nanoparticles are uniformly dispersed in acrylic resin, as in the case of the penta-roof prism 104, and includes a dielectric multilayer for reflecting infrared light at the entrance face. Therefore, second-order images of the object formed on the light sensor 108 do not contain an infrared light component, and the light sensor 108 has a sensitivity to light whose wavelength is larger than 400 nm, so that a sensor output in response to visible light is acquired. In the case where an image of an object with visible light formed by the imaging lens 101 is captured, focus detection can be performed in accordance with visible light by acquiring the sensor output in response to the visible light.

Figure 3B:
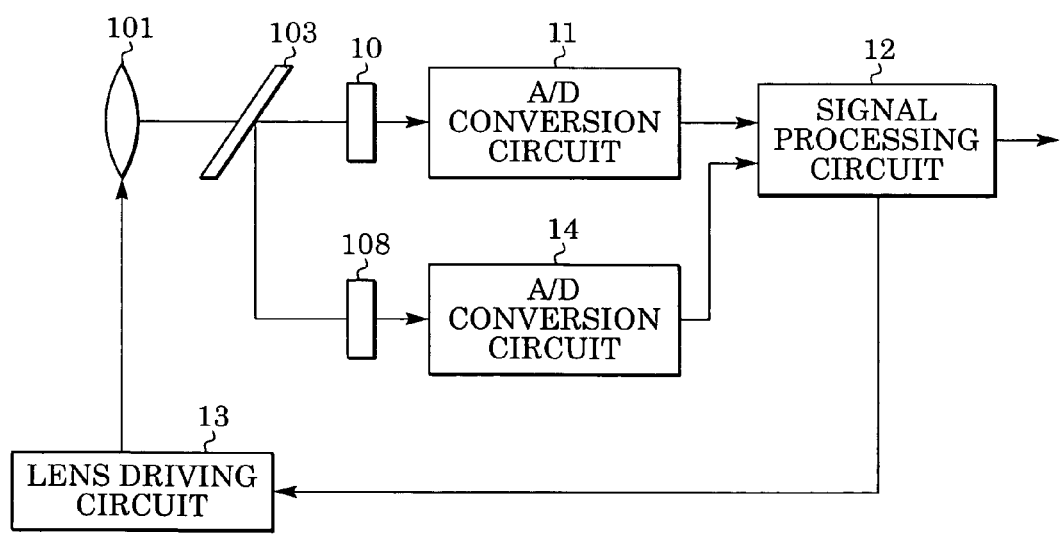
FIG. 3B is a block diagram of the SLR camera.

FIG. 3B is a block diagram partly showing the SLR camera. The same elements as in FIG. 3A have the same reference numbers. An area sensor 10 is used for forming an image, and a signal processing circuit 12 is used for performing signal processing on a signal from the area sensor 10 and the light sensor 108 via analog-to-digital (A/D) conversion circuits 11 and 14. Specifically, a signal processing circuit 12 performs white-balance (WB) calibration, gamma correction, edge enhancement, or the like on a signal from the area sensor 10 via the A/D conversion circuit 11, and performs computing for focus adjustment using a pair of signals which is sent from the light sensor 108 via the A/D conversion circuit 14 and is formed by a pencil of rays passing through different regions in the exit pupil of the imaging lens 101. The signal processing circuit 12 then moves the imaging lens 101 by controlling a lens driving circuit 13 in accordance with the computed result, so that focus adjustment is performed.

Figure 4:
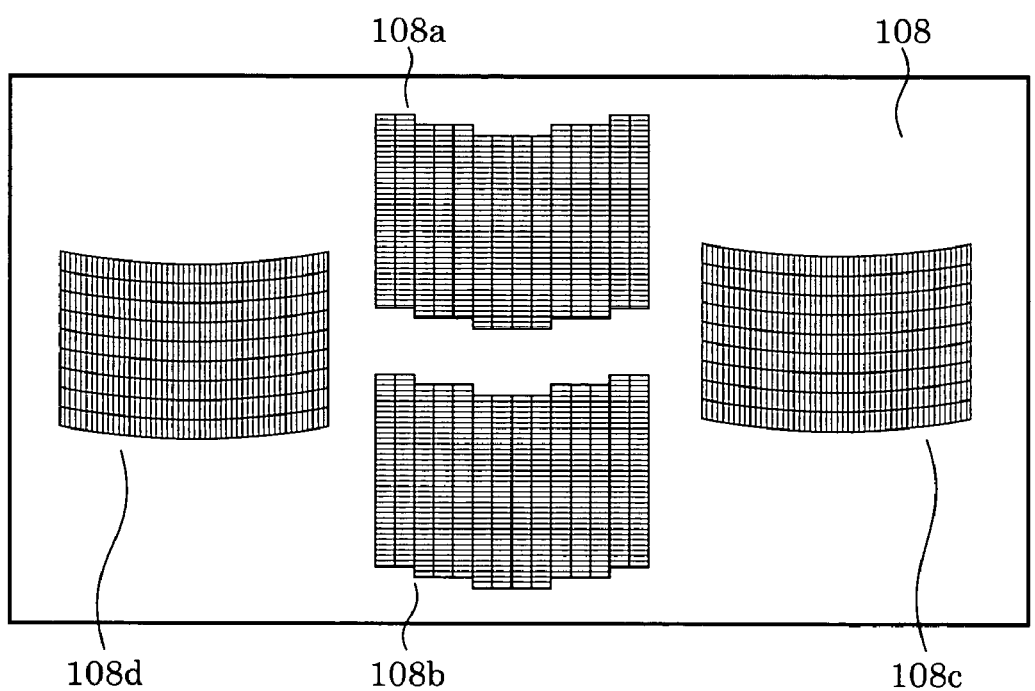
FIG. 4 is a plan view of the light sensor.

FIG. 4 is a plan view of the light sensor 108. The light sensor 108 includes four area sensor units 108a, 108b, 108c, and 108d disposed thereon. The light sensor 108 photoelectrically converts four images of an object formed by the re-imaging lens 107 by means of many pixels and produces electrical signals in accordance with the intensity distribution of the image of the object.

Figure 5:
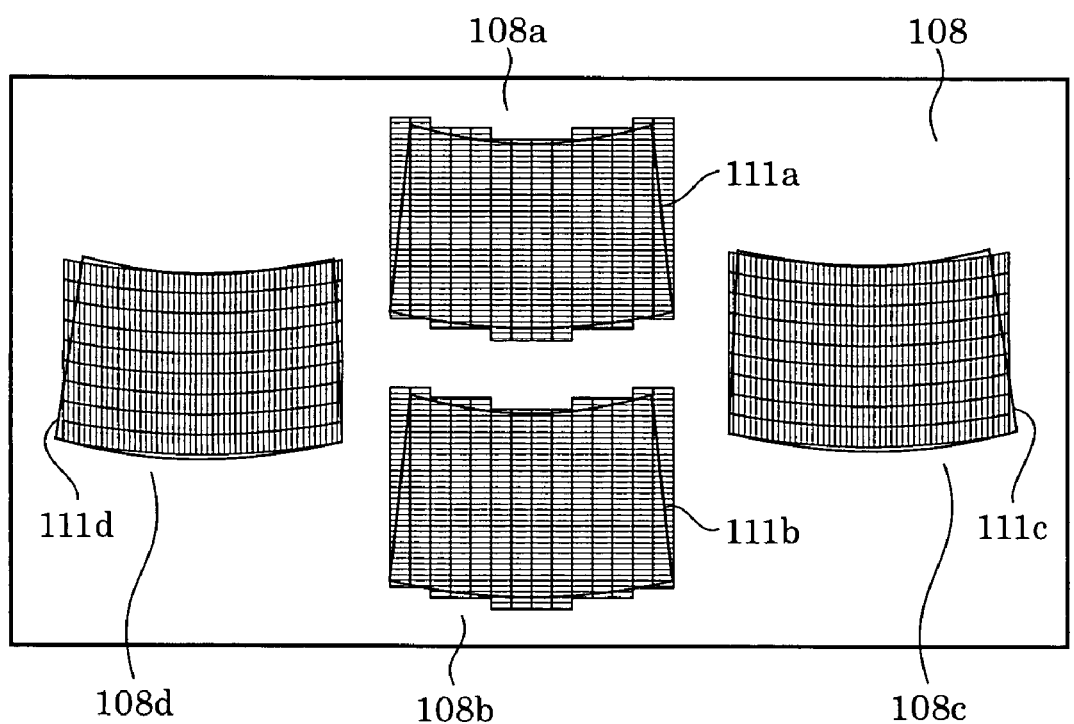
FIG. 5 is an illustration in which second-order images are superimposed on the light sensor.

FIG. 5 is an illustration in which second-order images are superimposed on the light sensor 108. A second-order image 111a exiting from the exit face 107a of the re-imaging lens 107 is formed on the area sensor unit 108a, a second-order image 111b exiting from the exit face 107b of the re-imaging lens 107 is formed on the area sensor unit 108b, a second-order image 111c exiting from the exit face 107c of the re-imaging lens 107 is formed on the area sensor unit 108c, and a second-order image 111d exiting from the exit face 107d of the re-imaging lens 107 is formed on the area sensor unit 108d in such a way that all the second-order images are reduced in size. The ratio of the second-order images formed on the area sensor units to the image formed on the image-capture surface can be on the order of 0.1 to 0.9. Since the surface-coated mirror 105 is tilted with respect to the optical axis 102, each of the second-order images 111a to 111d is distorted and exhibits a fan shape. The area sensor units 108a, 108b, 108c, and 108d correspond to this shape.

The focus detection of the imaging lens 101 is performed by detecting the gap between the second-order images 111a and 111b and the gap between the second-order images 111c and 111d using electrical signals output from the light sensor 108. This technique is called a phase difference detection method, since the amount of defocus of the imaging lens is derived from the phase difference between the positions of two images.

The composite, in which niobium oxide nanoparticles are uniformly distributed on the acrylic resin, used in the re-imaging lens 107 has small dimensional variations depending on variations in temperature or in humidity, and therefore, the phase difference between the positions of two images is less prone to vary even if temperature or humidity is varied. As a result, the focus detection can be stably realized in a wide range of temperature and humidity conditions.

In an image-capture structure that has a large image capture area of the same order of magnitude as a 135 film, the depth-of-field is significantly shallow. Therefore, in order to properly focus on a desired position of an object, it is necessary that each focus detection field be reduced to as small an area as possible. Using a portion of the area sensor unit in a single focus detection field allows the focus detection field to correspond to a small area of the object. In this case, dividing the area sensor unit and using divided sections can realize many focus detection fields.

Figure 6:
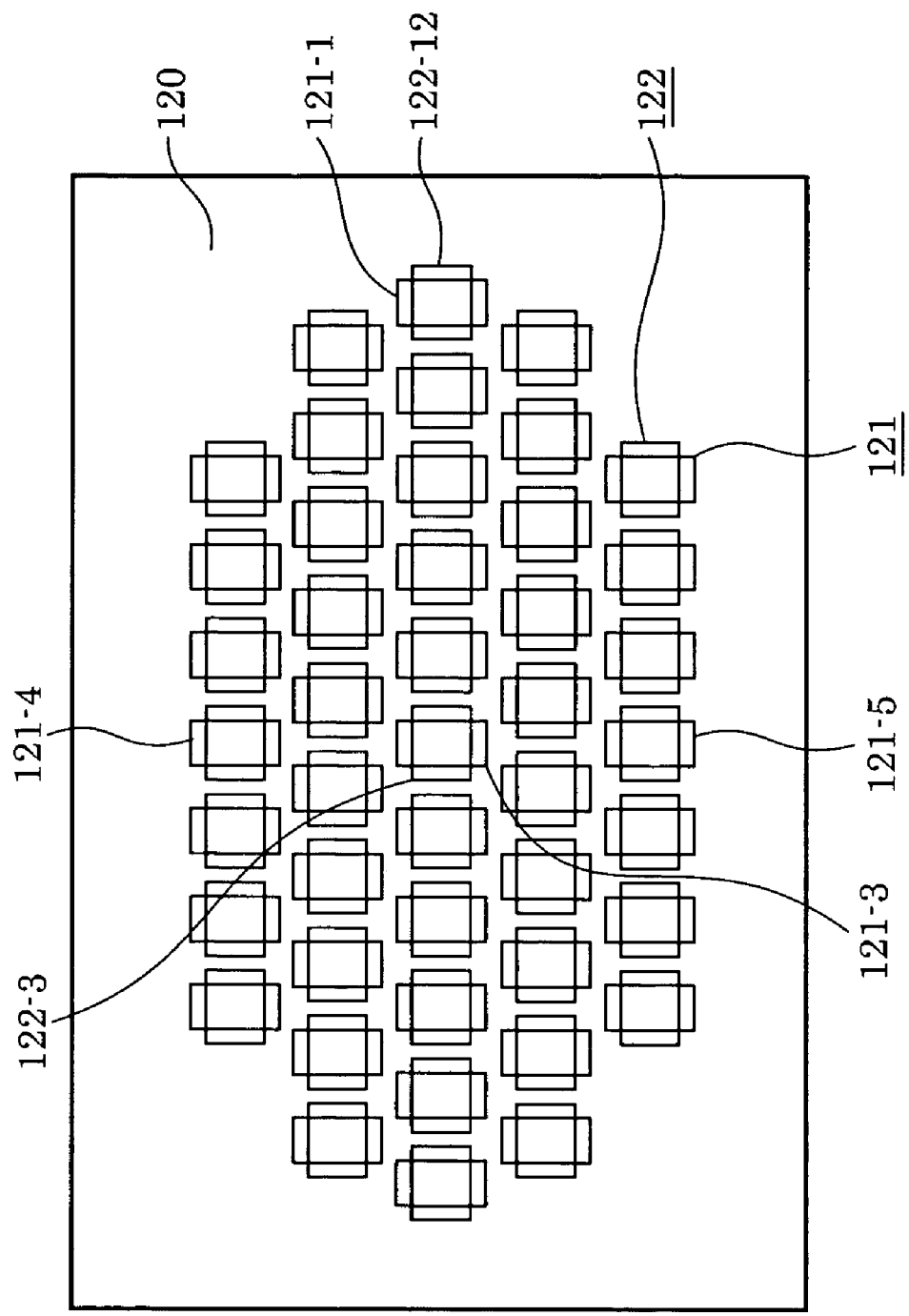
FIG. 6 shows focus detection fields determined by divided sections of an area sensor unit of the light sensor.

FIG. 6 shows focus detection fields determined by divided sections of the area sensor unit of the light sensor 108. A finder field 120 considers an image-capture range as an observation range. In the image capture range, forty-five points used for focus detection are defined. In each focus detection point, a focus detection subfield 121 composed of pixels vertically oriented and a focus detection subfield 122 composed of pixels horizontally oriented are arranged. In other words, each of the forty-five focus detection fields is composed of two focus detection subfields in a cross arrangement. A central focus detection subfield 121-3 and a central focus detection subfield 122-3 are positioned in a line continuing from the optical axis 102.

Since focus detection subfields composed of vertically oriented pixels possess the sensitivity to vertical luminance distribution, they can detect a focus with respect to, for example, a horizontal line. On the other hand, focus detection subfields composed of horizontally oriented pixels possess the sensitivity to horizontal luminance distribution, and therefore they can detect a focus with respect to, for example, a vertical line. Using a combination of these focus detection subfields realizes focus detection with respect to luminance distribution in every direction.

Figure 7:
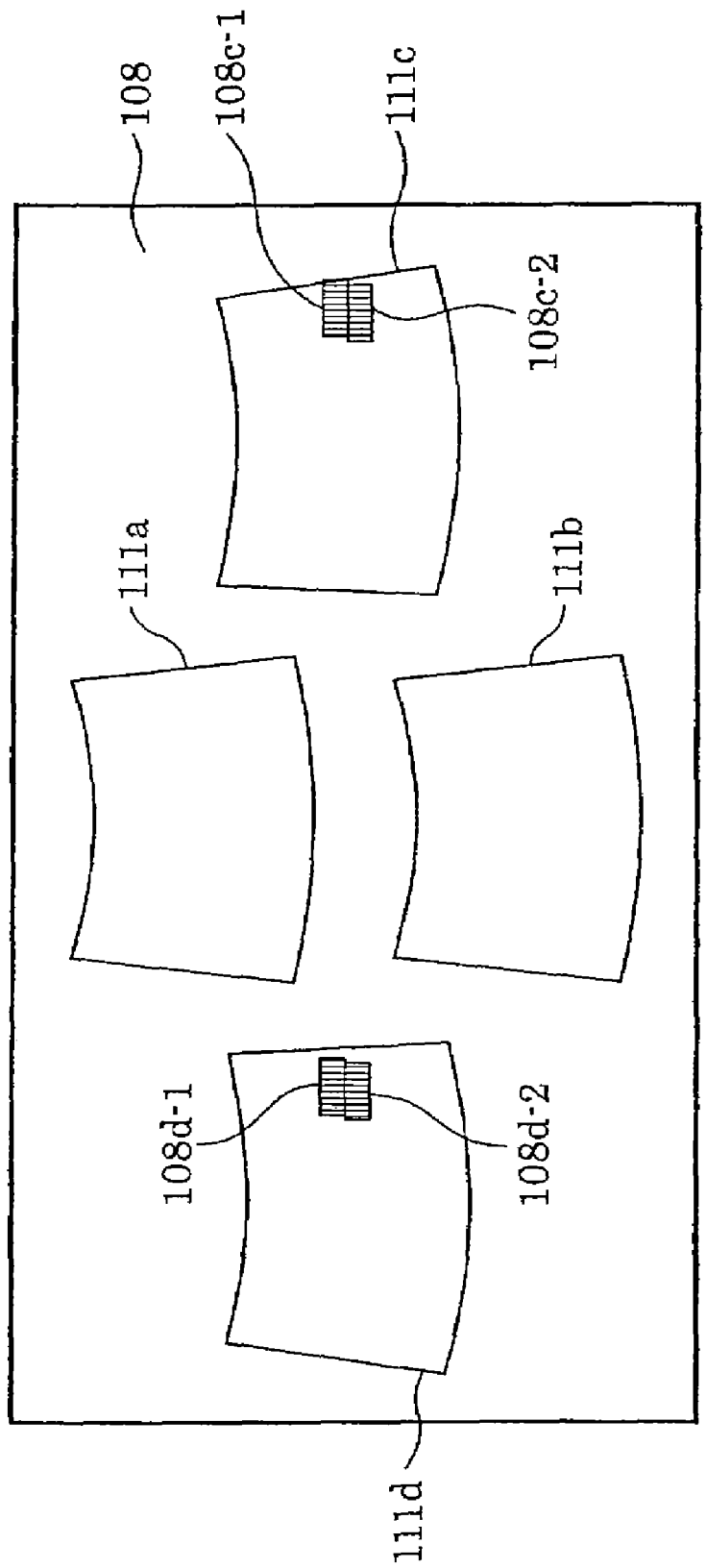
FIG. 7 is an illustration for explaining how the area sensor unit is divided and shows one focus detection field in the area sensor unit.

FIG. 7 is an illustration for explaining the division of the area sensor unit and shows a single focus detection field of the area sensor unit. Pixel arrays 108c-1, 108c-2, 108d-1, and 108d-2 constitute a focus detection subfield 122-12 shown in FIG. 6 and constitute one focus detection subfield that is horizontally oriented. The pixel arrays 108c-1 and 108c-2 are included in the area sensor unit 108c, and the pixel arrays 108d-1 and 108d-2 are included in the area sensor unit 108d.

The phase difference between positions of two images of the pixel arrays 108c-1 and 108c-2 and that for the pixel arrays 108d-1 and 108d-2 is acquired, so that the amount of defocus of the imaging lens is derived. The two amounts of defocus derived from two sets of pixel arrays are averaged, and the average is regarded as the final result of focus detection in the outer focus detection subfield 122-12. When the amount of defocus that is finally determined is not substantially considered as zero, i.e., it is determined that focus is not attained, the imaging lens 101 is entirely or partly moved along the optical axis 102, so that an object present in this focus-detection position can be focused.

Figure 8:
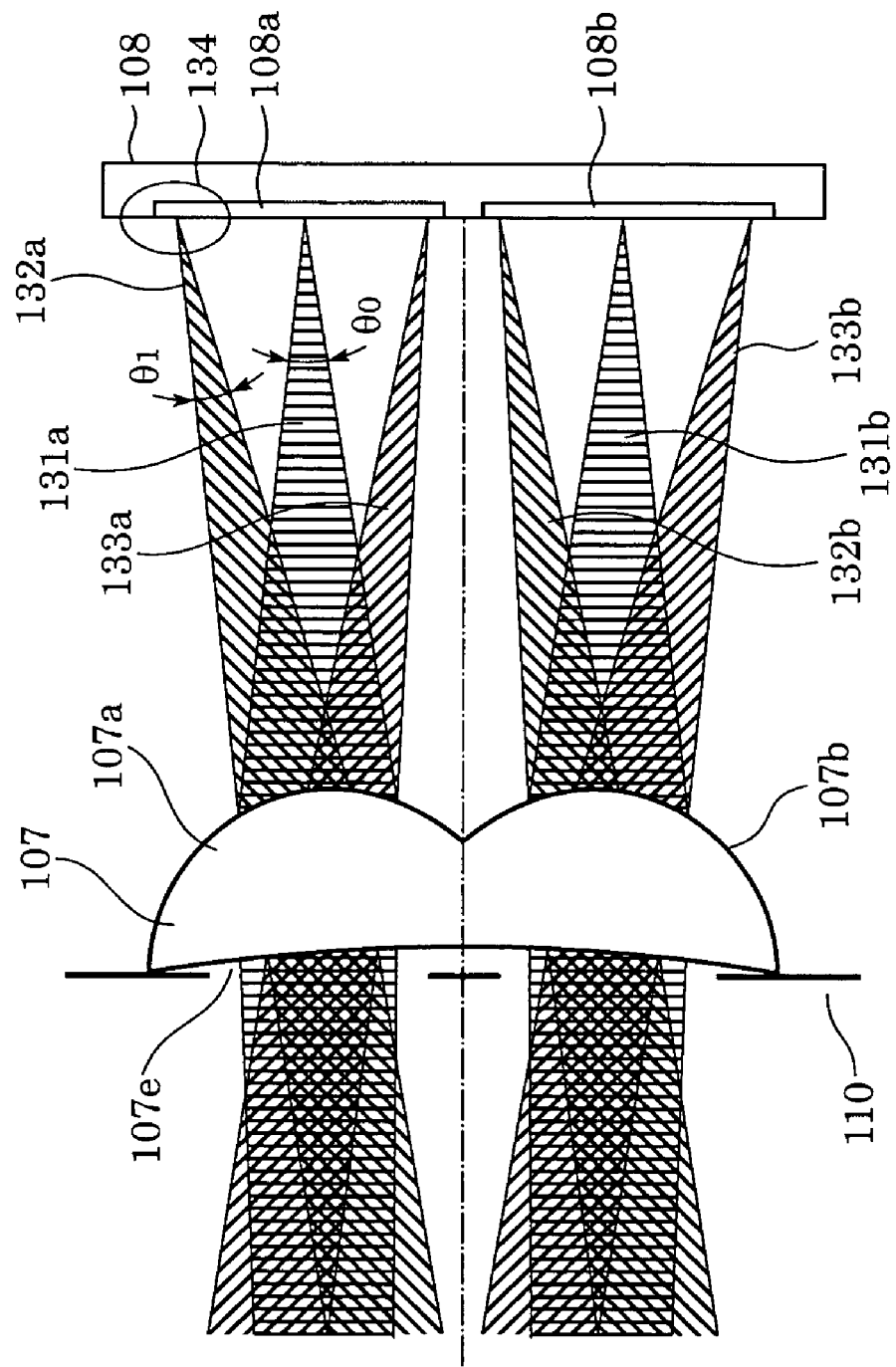
FIG. 8 shows an optical path around the re-imaging lens and the light sensor, and is a cross-sectional view of the re-imaging lens as taken along central portions of exit faces of the re-imaging lens.

Next, a pencil of rays for focus detection is described. FIG. 8 shows an optical path around the re-imaging lens 107 and the light sensor 108, and is a cross-sectional view of the re-imaging lens 107 as taken along the central portions of the exit faces 107a and 107b of the re-imaging lens 107.

In FIG. 8, a pencil of rays 131a is imaged in the center of the area sensor unit 108a, and a pencil of rays 131b is imaged in the center of the area sensor unit 108b. A pencil of rays 132a is imaged in the top of the area sensor unit 108a, and a pencil of rays 132b is imaged in the top of the area sensor unit 108b. A pencil of rays 133a is imaged in the bottom of the area sensor unit 108a, and a pencil of rays 133b is imaged in the bottom of the area sensor unit 108b.

The pencils of rays 131a and 131b are the pencils in which pencils of rays exiting from the imaging lens 101 and reaching the central focus detection subfield 121-3 shown in FIG. 6 are divided by the half mirror 103 and are then captured in a focus detection structure. Similarly, the pencils of rays 132a, 132b, 133a, and 133b are formed in the same fashion; the pencils of rays 132a and 132b correspond to the pencils reaching the outer focus detection subfield 121-4; and the pencils of rays 133a and 133b correspond to the pencils reaching the outer focus detection subfield 121-5.

Although the details are described later, the angle of incidence properties of the light sensor are controlled, so that an f-number for the pencil of rays for focus detection is different from one divided pixel array of the light sensor to another. As is apparent from the fact that the relationship between the angle of the pencil of rays 131a, θ0, and the angle of the pencil of rays 132a, θ1, is θ0 > θ1, the pencils of rays 132a, 132b, 133a, and 133b for the outer focus detection subfields 121-4 and 121-5 are narrower and darker than the pencils of rays 131a and 131b for the central focus detection subfield 121-3. In other words, a region where a pencil of rays passes through the exit pupil of the imaging lens is larger at the central focus detection field and smaller at the outer focus detection fields.

Therefore, since the f-number varies with the positions of the focus detection fields, a re-imaging optical system includes no aperture stop restricting a pencil of rays for the entire image. The major reason that the porous mask 110 is disposed is to prevent the occurrence of a ghost, and therefore, the porous mask 110 includes an aperture whose dimensions are determined so as not to cause vignetting with respect to the outermost rays.

Figure 9:
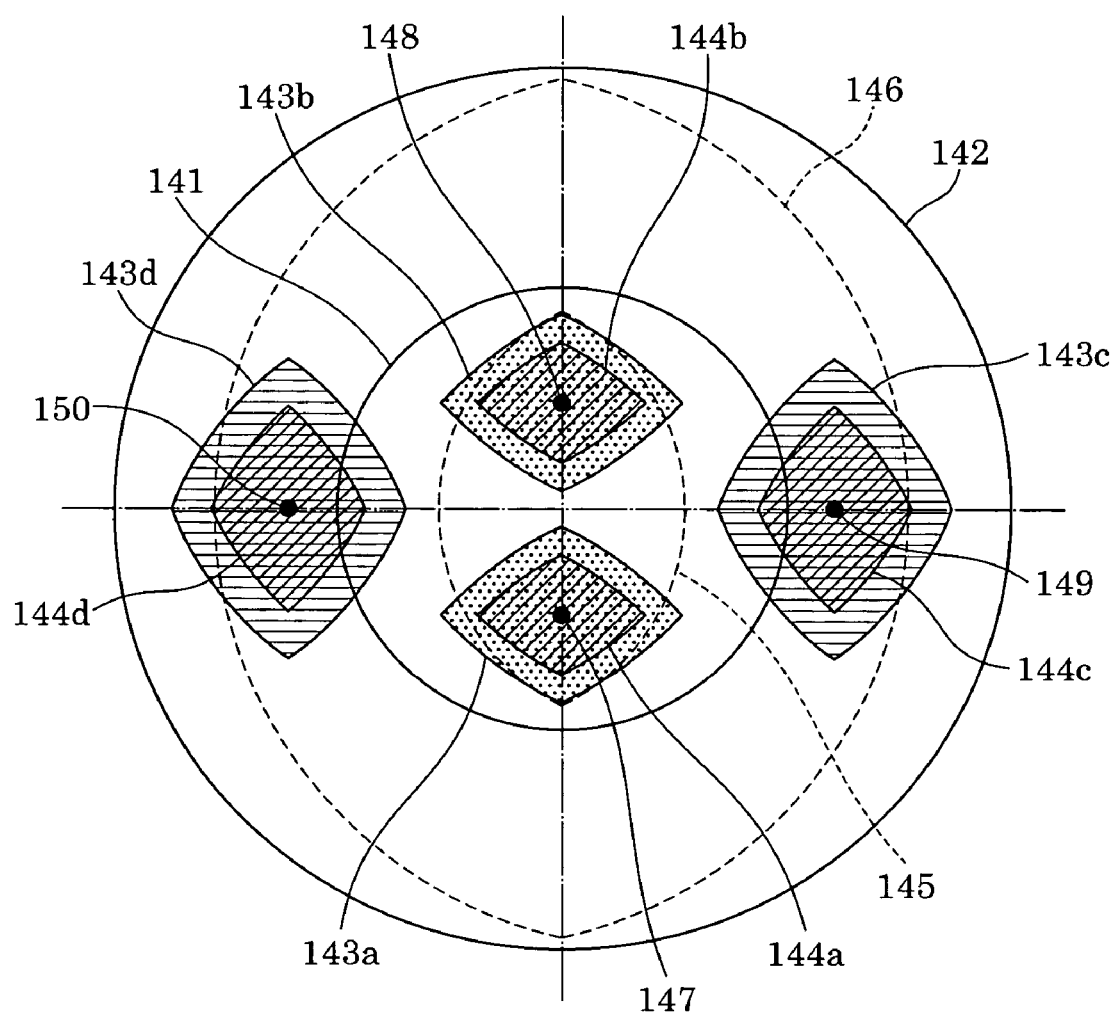
FIG. 9 shows a region where a pencil of rays used for focus detection passes through an exit pupil of an imaging lens.

FIG. 9 is an illustration for explaining a region where a pencil of rays used for focus detection passes through the exit pupil of the imaging lens. On the assumption that the imaging lens would be interchangeable with various lens elements, in consideration of exit windows of all the imaging lens elements, the position of the exit window representative of an imaging lens element group is determined.

As described above, the second-order images 111a, 111b, 111c, and 111d are formed through the four exit faces 107a, 107b, 107c, and 107d. The combination of the second-order images 111a and 111b, which is used for phase difference detection, corresponds to the combination of the exit faces 107a and 107b. Similarly, the combination of the second-order images 111c and 111d, which is used for a phase difference detection, corresponds to the combination of the second-order images 107c and 107d. The gap between the exit faces 107a and 107b is set to be smaller, whereas the gap between the exit faces 107c and 107d is set to be larger. Therefore, the baseline length for range measurement in focus detection using the second-order images 111a and 111b is shorter, whereas that using the second-order images 111c and 111d is longer. As a result, the gap of a pair of regions where a pencil of rays for focus detection passes through the exit pupil for the second-order images 111a and 111b is smaller and that for the second-order images 111c and 111d is larger.

For example, the focus detection structure is determined so that the second-order images 111a and 111b do not undergo vignetting when the maximum f-number is smaller than f/5.6, and the second-order images 111c and 111d do not undergo vignetting when the maximum f-number is smaller than f/2.8. In other words, a focus detection subfield composed of a vertically oriented pixel array is operable when the maximum f-number is smaller than f/5.6, and a focus detection subfield composed of a horizontally oriented pixel array is operable when the maximum f-number is smaller than f/2.8.

Under such conditions, a pupil region 141 shown in FIG. 9 represents a region where a pencil of rays for focus detection for the central focus detection subfield 121-3 can pass through without undergoing vignetting, and a pupil region 145 represents a region where a pencil of rays for focus detection of the outer focus detection subfield 121-1 can pass through without undergoing vignetting. In the outer area of the image capture screen, vignetting of the imaging lens is present. Therefore, a pupil region where a pencil of rays for focus detection can pass through varies with the positions of the focus detection fields; the pupil region is largest at the center of the screen and becomes smaller as it approaches the edge.

Similarly, a pupil region 142 represents a region where a pencil of rays for focus detection for the central focus detection subfield 122-3 can pass through without undergoing vignetting, and a pupil region 146 represents a region where a pencil of rays focus detection of the outer focus detection subfield 122-12 can pass through without undergoing vignetting. Regions 143a and 143b represent regions where a pencil of rays for focus detection for the central focus detection subfield 121-3 actually passes, and regions 144a and 144b represent regions where a pencil of rays for focus detection of the outer focus detection subfield 121-1 actually passes.

The determination of a region where a pencil of rays for focus detection passes through the exit pupil is realized by controlling the angle of incidence properties of the light sensor. This determination is explained below by following the optical path which travels from the imaging lens to the light sensor in reverse. First, the angle of incidence properties of the light sensor are determined, and the position where a pencil of rays passes through the re-imaging lens 107 is defined. Then, the position where the pencil of rays passes through the exit pupil of the imaging lens 101 is determined from the projective relationship between the re-imaging lens 107 and the exit pupil of the imaging lens 101, the projective relationship being realized by the surface-coated mirror 105.

The regions 143a and 143b where a pencil of rays for focus detection passes through are present within the pupil region 141. The regions 144a and 144b where a pencil of rays for focus detection passes through are present within the pupil region 145. Since the amount of light projected on the light sensor increases with increase in the area of the regions where a pencil of rays for focus detection passes through, focus detection of an object with a low brightness can be realized with high accuracy. In this case, the gap between a pair of the regions where a pencil of rays for focus detection passes through may be varied with the positions of the focus detection fields.

Similarly, regions 143c and 143d represent regions where a pencil of rays for focus detection for the central focus detection subfield 122-3 passes through. Regions 144c and 144d represent regions where a pencil of rays for focus detection for the outer focus detection subfield 122-12 passes through. The regions 143c and 143d are present within the pupil region 142, and the regions 144c and 144d are present within the pupil region 146.

From the viewpoint of the utilization efficiency of light from an object, a region where a pencil of rays for focus detection can actually pass through is large at a focus detection field that is disposed in the center of a screen and that has a large pupil region, as the properties of the imaging lens. On the other hand, a region where a pencil of rays for focus detection can actually pass through is small at a focus detection field that is disposed in the outer area of the screen, that has a small pupil region, as the properties of the imaging lens, and that is thus prone to causing vignetting. As a result, requirements for both the amount of light at the center of the screen and the arrangement of the outer area are well satisfied, and the utilization of the light from the object is considerably efficient.

Figure 10:
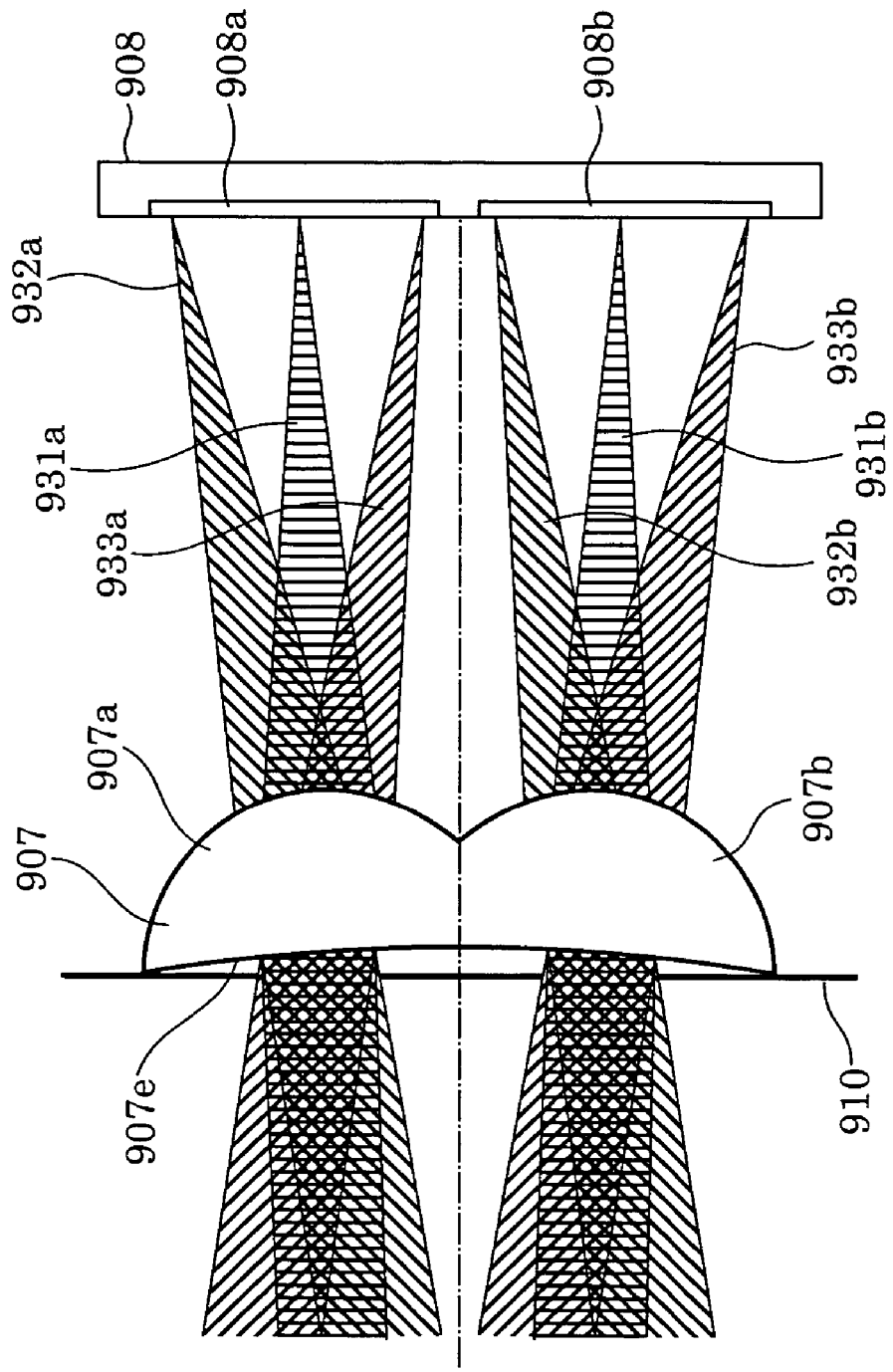
FIG. 10 shows an optical path when an aperture stop is used for comparison.

If a pencil of rays for focus detection is defined in such a way that the re-imaging system includes an aperture stop, the f-number will be substantially the same among the focus detection fields, and therefore, the advantages described above will not be realized. FIG. 10 shows an optical path when an aperture stop is used for comparison. In FIG. 10, a re-imaging lens 907 includes a single toric concave face 907e at the entrance face and includes elliptical convex faces 907a and 907b at the exit face; a light sensor 908 is used for focus detection; a porous stop 910 functions as a mechanical aperture stop; a pencil of rays 931a is the pencil to be imaged on the center of an area sensor unit 908a; a pencil of rays 931b is the pencil to be imaged on the center of an area sensor unit 908b; a pencil of rays 932a is the pencil to be imaged on the top of the area sensor unit 908a; a pencil of rays 932b is the pencil to be imaged on the top of the area sensor unit 908b; a pencil of rays 933a is the pencil to be imaged on the bottom of the area sensor unit 908a; and a pencil of rays 933b is the pencil to be imaged on the bottom of the area sensor unit 908b.

The pencils of rays 931a and 931b are the pencils in which pencils of rays reaching the central focus detection subfield 121-3 shown in FIG. 6 are divided by the half mirror 103 and are then captured in a focus detection structure. The pencils of rays 932a, 932b, 933a, and 933b are formed in the same fashion; the pencils of rays 932a and 932b correspond to the pencils reaching the outer focus detection subfield 121-4; and the pencils of rays 933a and 933b correspond to the pencils reaching the outer focus detection subfield 121-5.

Figure 11:
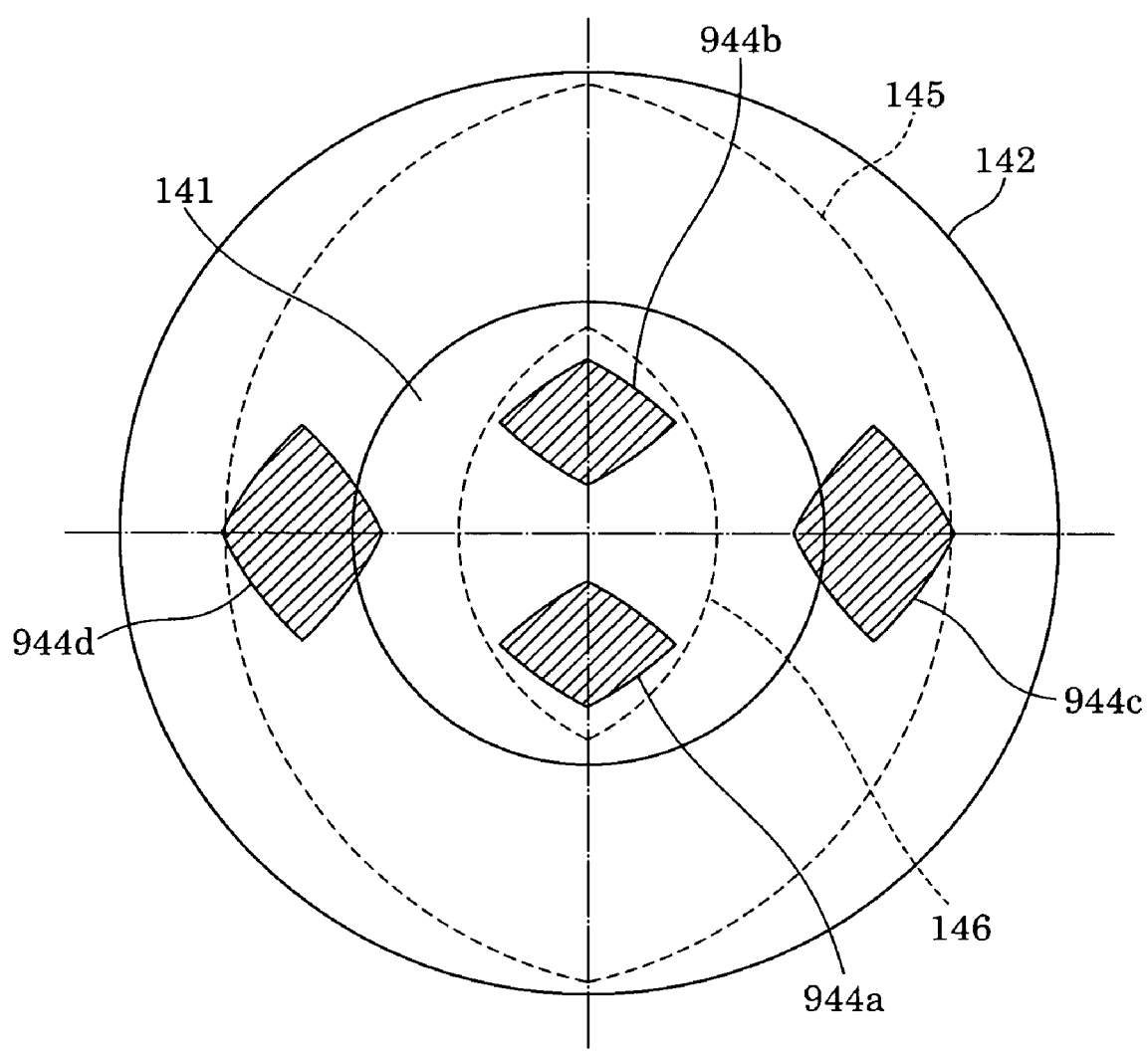
FIG. 11 shows a region where a pencil of rays used for focus detection passes through the exit pupil of the imaging lens.

The pencils of rays 932a, 932b, 933a, and 933b for the outer focus detection subfields 121-4 and 121-5 and the pencils of rays 931a and 931b for the central focus detection subfield 121-3 have substantially the same thickness by the action of the porous stop 910, and this means that the f-numbers are substantially the same. Therefore, as shown in FIG. 11, a region where a pencil of rays for focus detection for the central focus detection subfield 121-3 passes through the exit pupil and that for the outer focus detection subfield 121-1 overlap one another and are indicated by regions 944a and 944b; and a region where a pencil of rays for focus detection for the central focus detection subfield 122-3 passes through the exit pupil and that for the outer focus detection subfield 122-12 overlap one another and are indicated by regions 944c and 944d. As a result, although being largely remote from the pupil region in terms of the properties of the imaging lens, a region where a pencil of rays for focus detection for a focus detection field present in the center of the screen passes through is small. Therefore, light from an object is not used effectively.

Figure 1A:
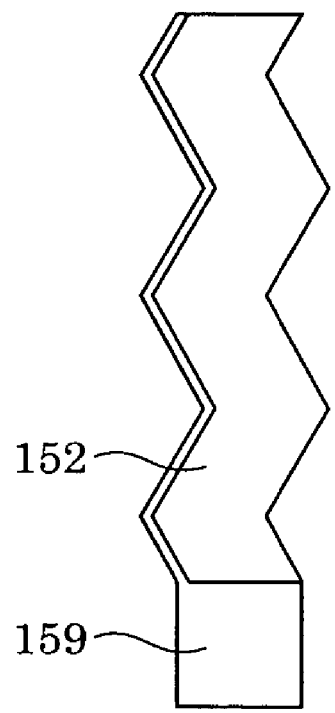
FIGS. 1A and 1B show a light sensor of a focus detection system according to an embodiment of the present invention.
Figure 1B:
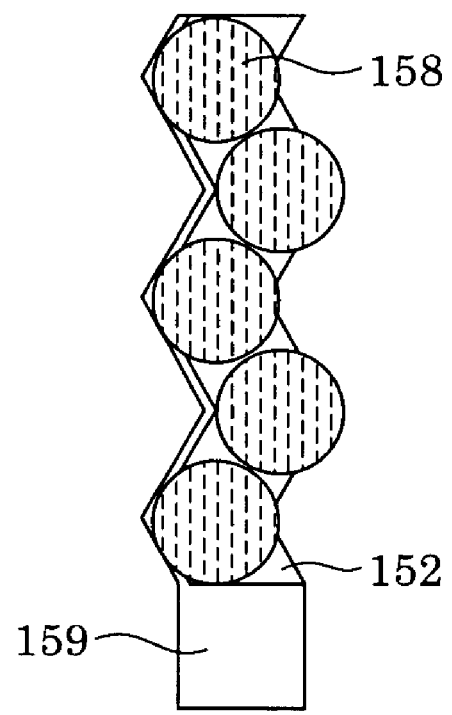
Figure 12:
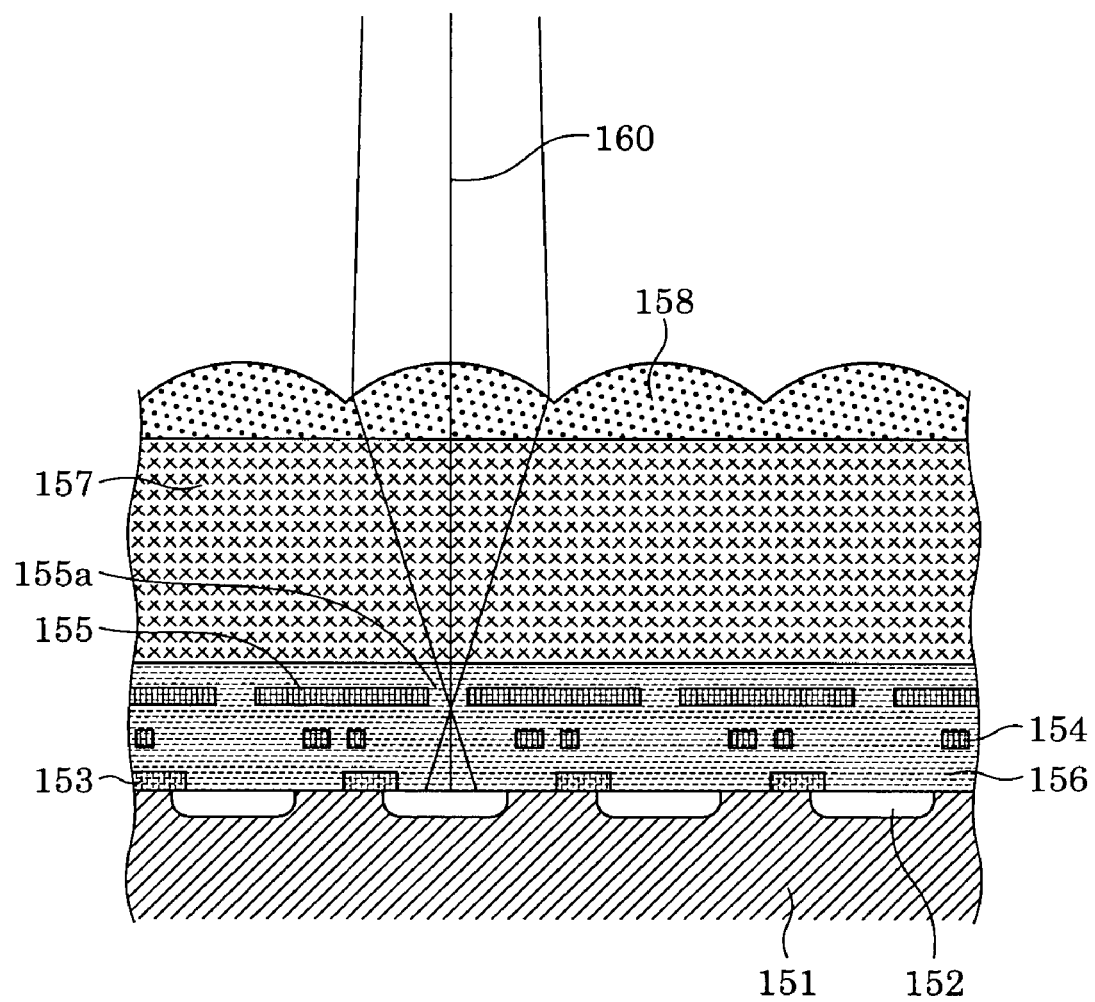
FIG. 12 is a cross-sectional view of a pixel part of the light sensor.

Next, the structure of the light sensor 108 is described. FIG. 12 is a cross-sectional view of a pixel part of the light sensor 108. FIG. 1A is a plan view showing a photoelectrical conversion unit of one pixel of the light sensor 108, and FIG. 1B is a plan view of one pixel of the light sensor 108. In FIG. 12, a light ray enters the light sensor 108 from above. In FIGS. 1A and 1B, a light ray enters the light sensor 108 from the vertical direction and upper part to plane describing FIGS. 1A and 1B. The light sensor 108 is a complementary metal oxide semiconductor (CMOS) sensor including microlenses, and the function of the microlenses of the light sensor 108 can determine the f-number for a pencil of rays for focus detection.

Referring to FIG. 12, the light sensor 108 includes a silicon substrate 151; photoelectric conversion units 152 composed of built-in photodiodes; a polysilicon wiring layer 153; a first wiring layer 154 made of aluminum or copper; a second opaque wiring layer 155 using aluminum or copper; an interlayer 156 functioning as an insulating layer and passivation layer and being made of a silicon oxide layer, a hydrophobic porous silica, a silicon oxynitride layer, a silicon nitride layer, or the like; microlenses 158; and a planarization layer 157 for setting the distance between the second wiring layer 155 and the microlenses with high accuracy. The second wiring layer 155 is a metal layer including discrete apertures, so that an area other than the apertures does not allow visible light to pass therethrough. The second wiring layer 155 has both the electrical function of operating the light sensor 108 and the optical function of controlling the angle properties of pencils of rays received. The planarization layer 157 is produced by curing thermosetting resin or ultraviolet-curing resin subjected to a spin coat process, by bonding resin films together, or the like.

As shown in FIG. 1A, the photoelectric conversion units 152 exhibit a zigzag shape and connect with circuit units 159 at the edges. Each of the circuit units 159 contains a transfer metal oxide semiconductor (MOS) transistor functioning as a transfer switch, a reset MOS transistor for supplying reset potential, a source-follower amplifier MOS transistor, a selection MOS transistor for selectively outputting a signal from the source-follower amplifier MOS transistor, and the like. As shown in FIG. 1B, five microlenses 158 are disposed per one pixel on each of the photoelectric conversion units 152 in a zigzag fashion.

Each microlens 158 is made of resin, silicon dioxide ($SiO_2$), titanium oxide ($TiO_2$), silicon nitride ($Si_3N_4$) or the like, and is an axisymmetric spherical lens or an axisymmetric aspherical lens for not only collecting light but also imaging. Since the microlens has an axis of symmetry 160 (shown in FIG. 12), it exhibits a circular shape in a plan view. However, a plurality of microlenses is disposed per one pixel, so that the area of light received per one pixel is large. As a result, the light sensor can sufficiently output a signal with respect to an object with a low brightness. Additionally, in order to suppress the surface reflection of light, the microlens may include a low refractive-thin layer or a subwavelength structure with a wavelength less than the visible light in its surface.

The pencil of rays exiting from the re-imaging lens 107 enters the microlenses 158 of the light sensor 108. A light component passing through apertures 155a formed in the second wiring layer 155 then enters the photoelectric conversion units 152, so that the component is converted into an electrical signal. Since the second wiring layer 155 also functions as a light-blocking layer used for producing apertures, a separate light-blocking layer for producing apertures is not necessary. This simplifies the structure of the light sensor 108.

Figure 2:
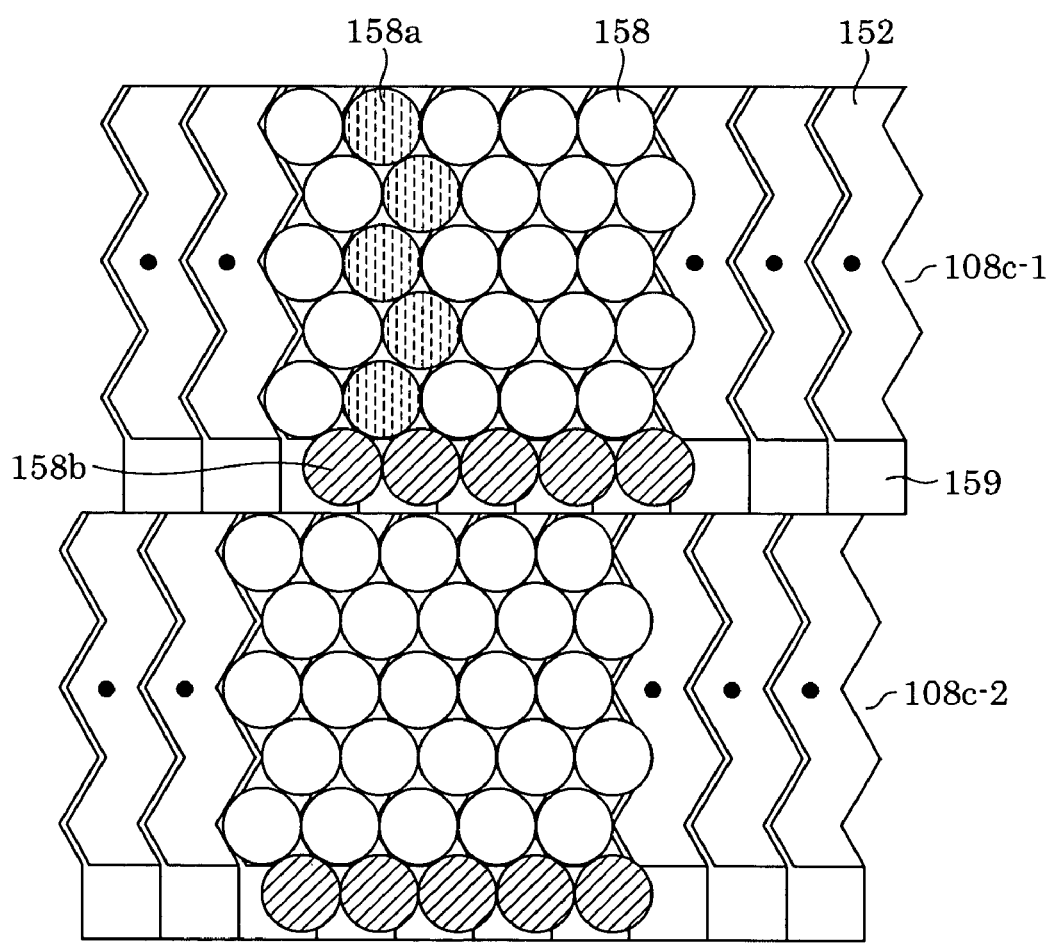
FIG. 2 is a plan view of a pixel array in which the pixel shown in FIGS. 1A and 1B is connected together with other pixels so as to be used in focus detection.
Figure 13:
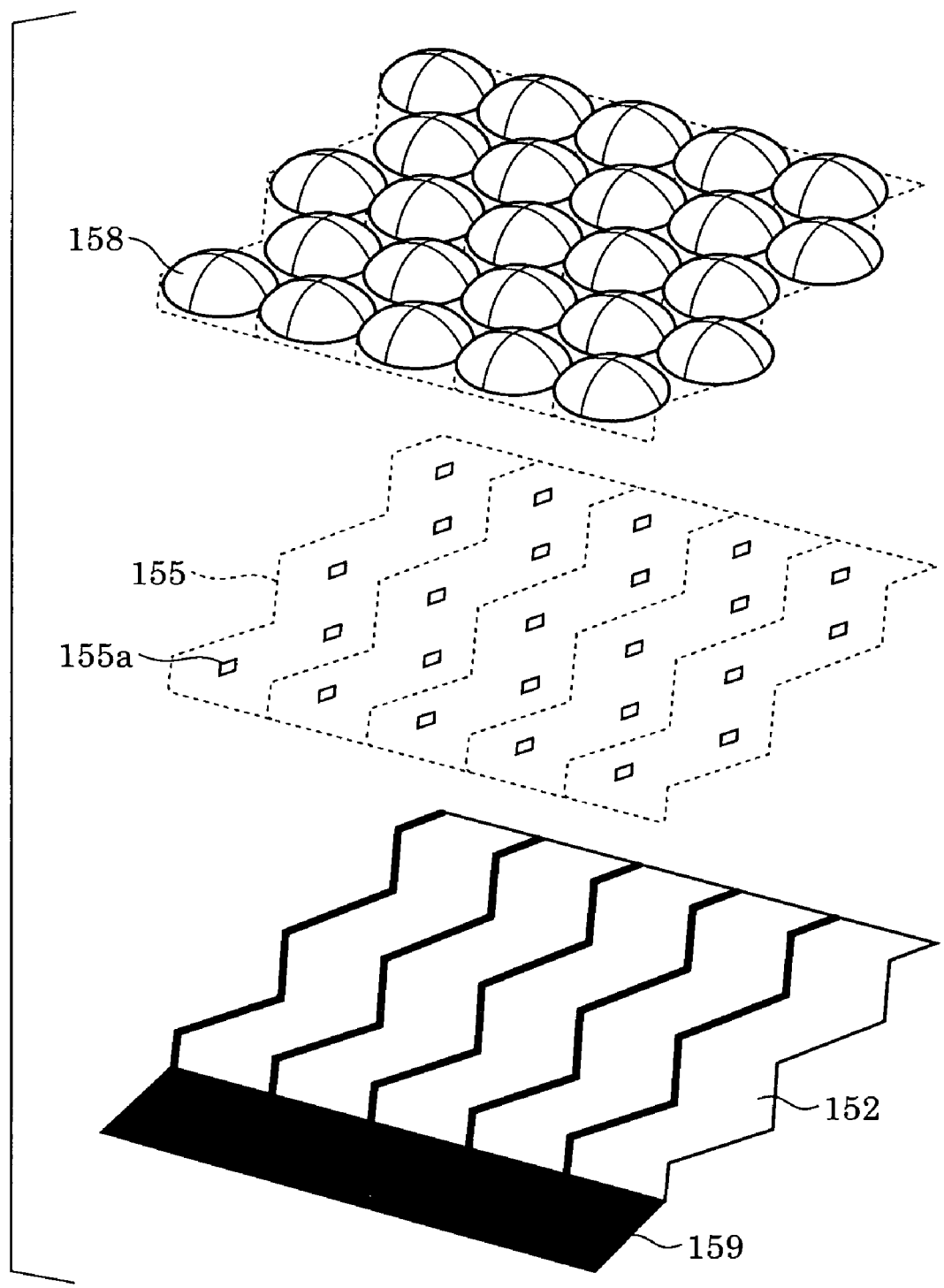
FIG. 13 is a perspective view of the pixel array in which the pixel shown in FIGS. 1A and 1B is connected together with other pixels so as to be used in focus detection.

FIGS. 2 and 13 show a pixel array in which the pixel shown in FIGS. 1A and 1B is connected together with other pixels so that the pixel array is used in focus detection. FIG. 2 is a plan view, and FIG. 13 is a perspective view. In FIG. 2, in order to clarify the positional relationship between the photoelectric conversion units 152 and the microlenses 158, the microlenses at the opposite edges are omitted, and the photoelectric conversion units at the opposite edges are rendered visible. In FIG. 13, the photoelectric conversion units 152, the second wiring layer 155, and the microlenses 158 are extracted from all components and are vertically shown in an exploded view. For the sake of clarity of the boundaries of pixels, the zigzag shape of the photoelectric conversion units is projected on the second wiring layer 155 and is indicated by the dotted line.

As shown in FIG. 2, five shaded microlenses 158a constitute one pixel. This pixel is laterally connected together with nine other pixels, so that a pixel array consisting of ten pixels is produced. Examples of such pixel arrays include pixel arrays 108c-1 and 108c-2 shown in FIG. 7. Since the zigzag microlenses bridge the gaps between adjacent pixels, the microlenses are close to one another in each pixel array. As a result, a pencil of rays that do not enter the microlenses and thus are not used can be reduced to a negligible amount. In terms of the orientation, the zigzag arrangement decreases the frequency response in pixel around Nyquist frequency. Therefore, when an image of an object including a spatial frequency component higher than Nyquist frequency is projected, it is less prone to cause aliasing. The phase difference detection with high accuracy is thus realized.

In addition, microlenses 158b which are not disposed on the photoelectric conversion units and are not associated with photoelectric conversion are arranged between adjacent pixel arrays, since uniform arrangement of microlenses leads to increased accuracy in manufacturing.

The second wiring layer 155, as shown in FIG. 13, includes many apertures 155a, each aperture having a rhombus shape geometrically similar to the shape of the pupil region shown in FIG. 9. The apertures 155a are disposed so as to be individually associated with the microlenses 158 and adjacent to the focuses of the microlenses. This structure allows the apertures 155a to be inversely projected on the exit pupil of the re-imaging lens 107 by means of the microlenses 158, so that the angle of incidence properties for a pencil of rays to be captured by the pixels can be determined by the shape of the apertures 155a.

In order not to unevenly output a focus-detection signal from the light sensor 108, the apertures 155a disposed in one pixel have the same shape. However, since a pencil of rays for focus detection can be varied within the pupil region where a pencil of rays for focus detection can pass without undergoing vignetting, the shape of the apertures 155a in one pixel array may be different from that in another pixel array, such as the adjacent pixel array. In order to avoid an error in phase difference detection of two images resulting from optical aberration of the re-imaging lens 107, it is effective to minimize displacements of the barycenters 147, 148, 149, and 150 even when the area of a region where a pencil of rays for focus detection varies, since every focus detection field uses the re-imaging lens 107.

Figure 14:
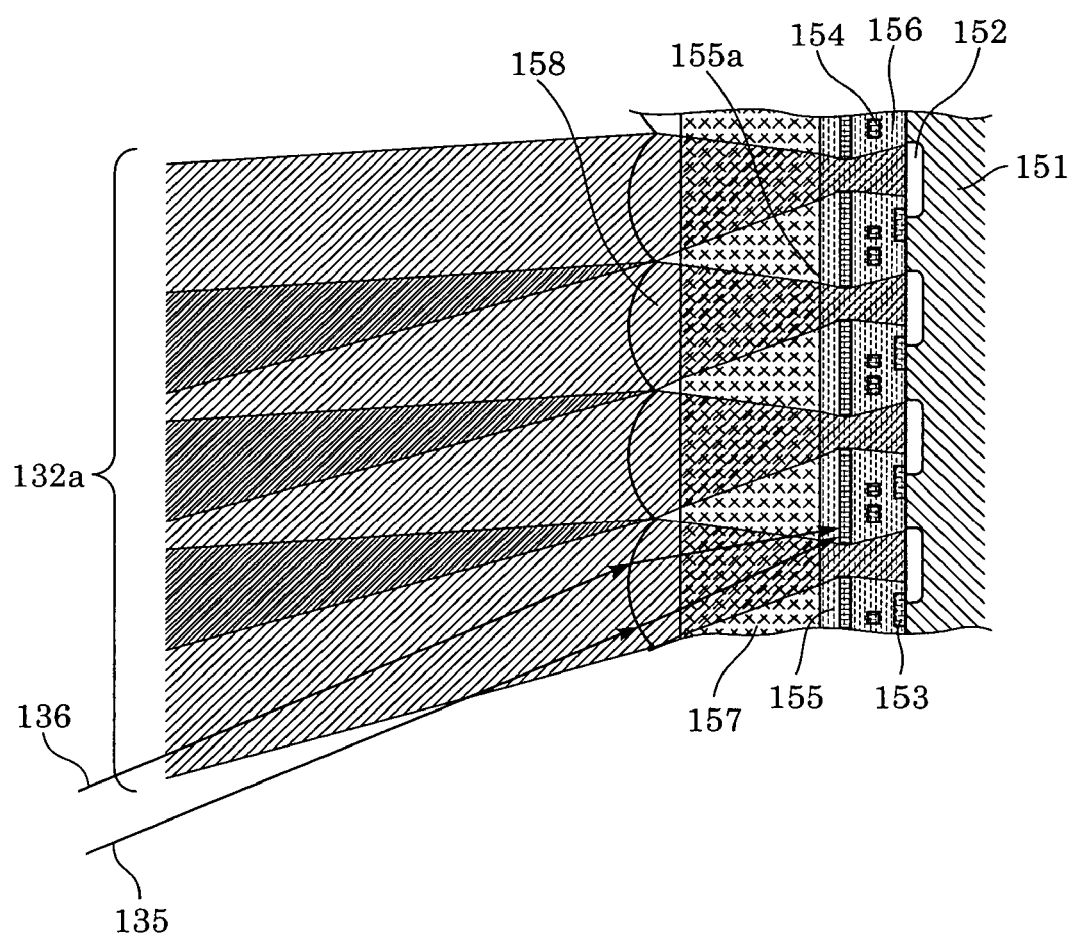
FIG. 14 is an enlarged view of the region shown in FIG. 8.

FIG. 14 is an enlarged view of a region 134 shown in FIG. 8. In the region 134 which lies in the outer portion of the area sensor unit, the microlenses 158 are decentered with respect to the apertures 155a of the second wiring layer 155 so that a pencil of rays exiting from the exit face 107a of the re-imaging lens 107 and entering the microlenses 158 is targeted at the apertures 155a. Since the microlenses 158 inversely project the apertures 155a of the second wiring layer 155 on the exit pupil of the re-imaging lens 107, the fact that the pencil of rays 132a can pass through the apertures 155a is equal to the fact that the pencil of rays 132a exits from the inversely projected image of the apertures 155a of the second wiring layer 155. Therefore, rays 135 and 136 which enter the light sensor 108 from locations other than the inversely projected image are inevitably blocked by the second wiring layer 155 and do not reach the photoelectric conversion units 152, and as a result, they are not subjected to photoelectric conversion.

In addition, since the entrance pupil of the re-imaging lens 107 and the exit pupil of the imaging lens 101 are conjugated by means of the surface-coated mirror 105, as shown in FIG. 3A, the determination of the a position where a ray passes through the re-imaging lens 107 determines a position where the ray passes through the exit pupil of the imaging lens 101. Therefore, the regions where a pencil of rays for focus detection passes through, as shown in FIG. 9, can be realized.

Figure 15:
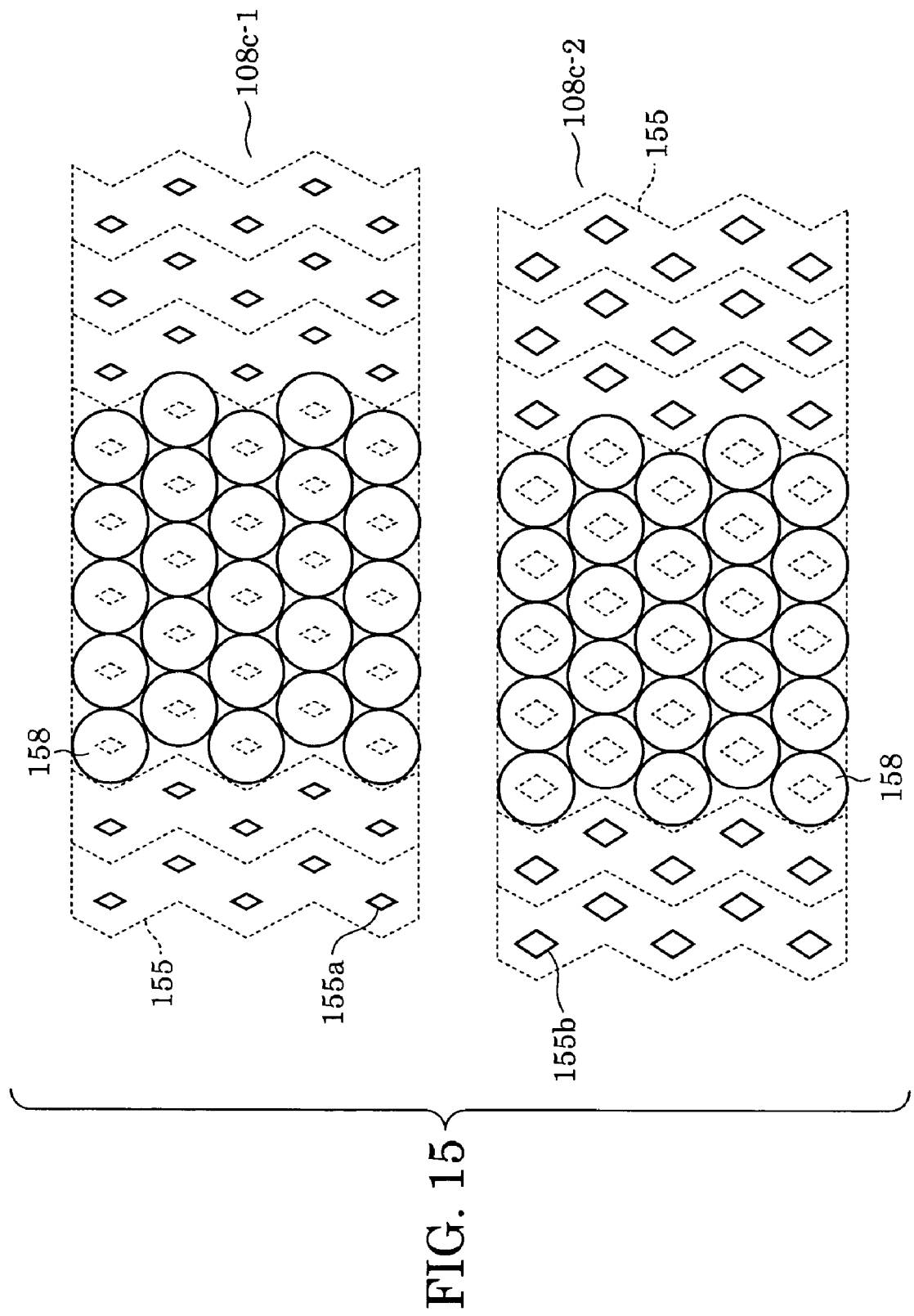
FIG. 15 is a plan view showing an example of the settings of a pencil of rays used for focus detection with respect to each pixel array in one focus detection field.

FIG. 15 is a plan view showing an example of the settings of a pencil of rays for focus detection with respect to each pixel array in one focus detection field. In FIG. 15, the two pixel arrays 108c-1 and 108c-2 of the outer focus detection subfield 122-12 shown in FIG. 6 are shown in such a way that the second wiring layer 155 and a portion of the microlenses 158 are extracted.

In the pixel array 108c-1, the apertures 155a of the second wiring layer 155 are set to be smaller. In the pixel array 108c-2, the apertures 155a of the second wiring layer 155 are set to be larger. Since the microlenses 158 have the same shape, a region where a pencil of rays for focus detection passes through the exit pupil of the imaging lens 101 in the pixel array 108c-1 is smaller, and that in the pixel array 108c-2 is larger, as previously described. When the region where a pencil of rays for focus detection for the pixel array 108c-2 passes through is present within the pupil region 146 shown in FIG. 9, that for the pixel array 108c-1 is present further inside that region.

As described above, a plurality of pixel arrays having different f-numbers constitutes one focus detection field, so that both the pixel arrays 108c-1 and 108c-2 in the outer focus detection subfield 122-12 are operable without the vignetting of a pencil of rays for focus detection when an imaging lens element with a maximum f/2.8 among a imaging lens group is used. When an imaging lens element with a maximum f-number slightly larger than f/2.8, for example, with a maximum f/3.5, is attached, only the pixel array 108c-1 is operable without the vignetting of a pencil of rays for focus detection. Therefore, the operable condition of the outer focus detection subfield 122-12 is eased.

In other words, the pixel array 108c-2 receives a large amount of light and is of high performance, whereas the pixel array 108c-1 receives a smaller amount of light but has a wide range of the operable condition. Therefore, since one focus detection field has pixel arrays with different properties, a camera can have improved functions. According to the embodiment of the present invention, focus detection in a wider area can be realized with a small light sensor. In addition, the amount of light introduced to the light sensor is increased, so that a focus detection system capable of performing stable focus detection on an object with a low brightness is realized. Moreover, the operable condition is eased, so that many kinds of imaging lens elements can be used. Additionally, the area of light received per one pixel becomes larger, thus resulting in a sufficient output from the light sensor even when an object with a low brightness is targeted. Furthermore, since it is not necessary to prepare a separate light-blocking layer for producing an aperture, the structure of the light sensor becomes simpler.

Except as otherwise disclosed herein, the various components shown in outline or in block form in the figures are individually well-known and their internal construction and operation are not critical either to the making or using of this invention or to a description of the best mode of the invention.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-118228 filed Apr. 13, 2004, which is hereby incorporated by reference herein.

What is claimed is:

1. A focus detection system comprising:
a sensor unit including, in each of a plurality of focus adjusting regions, a plurality of photoelectric conversion elements each provided with an aperture for a light passing through a re-imaging lens to pass therethrough after passing through the re-imaging lens, an aperture corresponding to each of the photoelectric conversion elements positioned in an outer area of the sensor unit being smaller than an aperture corresponding to each of the photoelectric conversion elements positioned in a central area of the sensor unit; and a focus detection unit for performing focus adjustment using a pair of signals output from the sensor unit, the pair of signals being formed by respective pencils of rays passing through different regions of an exit pupil of an imaging lens.

2. The focus detection system according to claim 1, wherein the sensor unit includes a first sensor unit for receiving light passing through a first region of the exit pupil of the imaging lens and a second sensor unit for receiving light passing through a second region of the exit pupil of the imaging lens, the second region being different from the first region.

3. The focus detection system according to claim 1, wherein the sensor unit includes circuit units for outputting signals from the plurality of photoelectric conversion elements to an output line, each circuit unit being associated with a plurality of the plurality of photoelectric conversion elements.

4. The focus detection system according to claim 3, wherein the plurality of photoelectric conversion elements outputting a signal to the same circuit unit are arranged in a zigzag fashion.

5. The focus detection system according to claim 1, further comprising a mask disposed between the sensor unit and the imaging lens, wherein the mask has an aperture larger than a region where a pencil of rays corresponding to an outermost distance-measuring point in the position of the mask passes through.

6. A camera comprising a focus detection system according to claim 1.

7. A camera according to claim 6, which is a single-lens-reflex camera.

8. A focus detection system comprising:

an imaging lens;

a half mirror for dividing light rays from the imaging lens into transmitted rays and reflected rays;

a sensor unit including, in each of a plurality of focus adjusting regions, a plurality of photoelectric conversion elements each provided with an aperture for a light passing through a re-imaging lens to pass therethrough after passing through the re-imaging lens, an aperture corresponding to each of the photoelectric conversion elements positioned in an outer area of the sensor unit being smaller than an aperture corresponding to each of the photoelectric conversion elements positioned in a central area of the sensor unit; and a focus detection unit for performing focus adjustment using a pair of signals output from the sensor unit, the pair of signals being formed by respective pencils of rays passing through different regions of an exit pupil of the imaging lens, wherein the reflected rays enter the sensor unit.

9. A camera comprising a focus detection system according to claim 8.

10. A camera according to claim 9, which is a single-lens-reflex camera.

11. A focus detecting device comprising:

an imaging lens;

a light sensor comprising in each of a plurality of focus adjusting regions a plurality of pixels, each pixel comprising a plurality of microlenses and, corresponding to each microlens of the plurality of microlenses, an aperture and a photoelectric conversion unit, wherein light passes through the microlens and aperture in that order to reach the photoelectric conversion unit; and a re-imaging lens for forming a plurality of second-order images on the light sensor using light from an object, wherein light passes through the microlens and aperture of the light sensor after passing through the re-imaging lens, wherein the apertures of a first plurality of pixels of the light sensor are smaller than the apertures of a second plurality of pixels of the light sensor.

12. A device according to claim 11, wherein for a pixel in an outer region of the light sensor, a microlens of the plurality of microlenses is decentered with respect to the corresponding aperture.

13. A device according to claim 11, wherein an entrance pupil of the re-imaging lens and an exit pupil of the imaging lens are conjugated by a mirror.

14. A device according to claim 11, wherein the first plurality of pixels are in an outer region of the light sensor and the second plurality of pixels are in a central region of the light sensor.

15. A device according to claim 11, wherein the plurality of microlenses for a pixel are not arranged in a straight line.

16. A device according to claim 15, wherein the plurality of microlenses for a pixel are arranged in a zigzag fashion.

17. A camera comprising a focus detecting device according to claim 11.

18. A camera according to claim 17, which is a single-lens-reflex camera.

19. A camera according to claim 17, wherein the re-imaging lens is made of a composite in which niobium oxide nanoparticles are uniformly dispersed in acrylic resin.

20. A camera according to claim 17, wherein an amount of defocus is determined in accordance with a phase difference between the positions of plural second-order images of the plurality of second-order images.

* * * * *